United States Patent

[11] 3,600,088

[72] Inventor Henry G. Joel
 New York, N.Y.
[21] Appl. No. 887,177
[22] Filed Dec. 22, 1969
[45] Patented Aug. 17, 1971
[73] Assignee Ing. C. Olivetti & C.S.p.A.
 Ivrea, Italy

[54] SCANNING OPTICAL SYSTEM
 10 Claims, 2 Drawing Figs.
[52] U.S. Cl. ..................................................... 355/47,
 355/49, 355/51, 355/66
[51] Int. Cl. ........................................................ G03b 27/50
[50] Field of Search ............................................ 355/8, 47,
 49, 51, 60, 66

[56] References Cited
 UNITED STATES PATENTS
2,234,717  3/1941  Altman et al. ................  355/49
3,142,224  7/1964  Andrews et al. ..............  355/47
3,364,816  1/1968  Jeffree ..........................  355/51
3,451,752  6/1969  Frank ...........................  355/66 X
3,481,670  12/1969  Amemiya et al. ............  355/66

Primary Examiner—Samuel S. Matthews
Assistant Examiner—Richard A. Wintercorn
Attorney—Kevin McMahon ABSTRACT: An optical system is provided for projecting an image of a fixed original onto a moving receiving surface comprising a rotating mirror which combines the two processes of directing a scanning beam of light against the original from a fixed source and directing the image modulated reflected light to a fixed objective lens.

Henry G. Joel
Inventor

SCANNING OPTICAL SYSTEM

BACKGROUND OF THE INVENTION

1. Field of the Invention

The present invention relates to optical systems used in reprographic apparatus for scanning a stationary original and providing a light image on a receiving surface that moves in synchronism with said scanning.

2. Description of the Prior Art

Both for ease and flexibility of operation and for safeguarding originals to be reproduced, it is desirable to maintain originals stationary. With the original stationary, it is possible to uniformly illuminate the original and provide an image on a stationary receiving surface. This is called a full-frame exposure and is not too popular due to the extreme difficulty of obtaining uniform illumination over the whole fame at once plus the added demands on the lens system. Accordingly some form of scanning is customary. One such system is disclosed in U.S. Pat. No. 3,431,053 to Richard Wick et al. The Wick et al. patent uses a scanning mirror and light source moving at a first speed to scan the original and a pair of mirrors arranged to intercept the reflected image segment from the scanning mirror and redirect it to a fixed lens. In order to keep the optical path length constant, the pair of mirrors is moved in the same direction as the scanning mirror at half the speed. This concept is also disclosed in U.S. Pat. No. 2,942,538 to Bechtold. The difficulties with this system are the number of elements that must be moved, the distance over which they must be moved and the space requirements.

A simpler system using a rotating mirror is disclosed in U.S. Pat. No. 2,508,650 to Pratt and Gray. Pratt and Gray place the original so that its surface is curved and then scan with a rotating plane mirror. The rotating motion provides an angle of reflection for successive image segments that is intercepted by a fixed objective lens. (Pratt and Gray interpose a folded telescoping mirror system in the path to the lens in order to change magnification.)

A major drawback of Pratt and Gray as well as many similar systems (see also U.S. Pat. No. 3,221,622 to Aser et al.) is the use of full frame illumination of the original. This has the same difficulties with respect to attaining uniform illumination as described before plus the additional inefficiency of illuminating the entire original while viewing it incrementally through a scanning slit.

SUMMARY OF THE INVENTION

According to the present invention an optical scanning system is provided in which a single scanning mirror assembly directs light from a stationary source incrementally across a surface to be scanned and simultaneously incrementally intercepts the light reflected from such surface and directs it to a stationary objective system. This system utilizes a single rotating mirror assembly which may have very low mass as the only moving part of the optical system. In a reprographic apparatus it is well adapted for use with a stationary original and a copy surface moving in synchronism with the mirror assembly rotation.

Thus it is an object of the invention to provide an optical scanning system for incrementally illuminating and viewing an original with a single rotatable assembly.

It is a further object of the invention to define a rotating mirror scanning system for use with a stationary original and a moving imaging surface in which the original is illuminated by scanning from a fixed light source.

Further objects and features of the invention will become apparent upon reading the following description together with the drawing.

DESCRIPTION OF THE PREFERRED EMBODIMENTS

Figure 1:
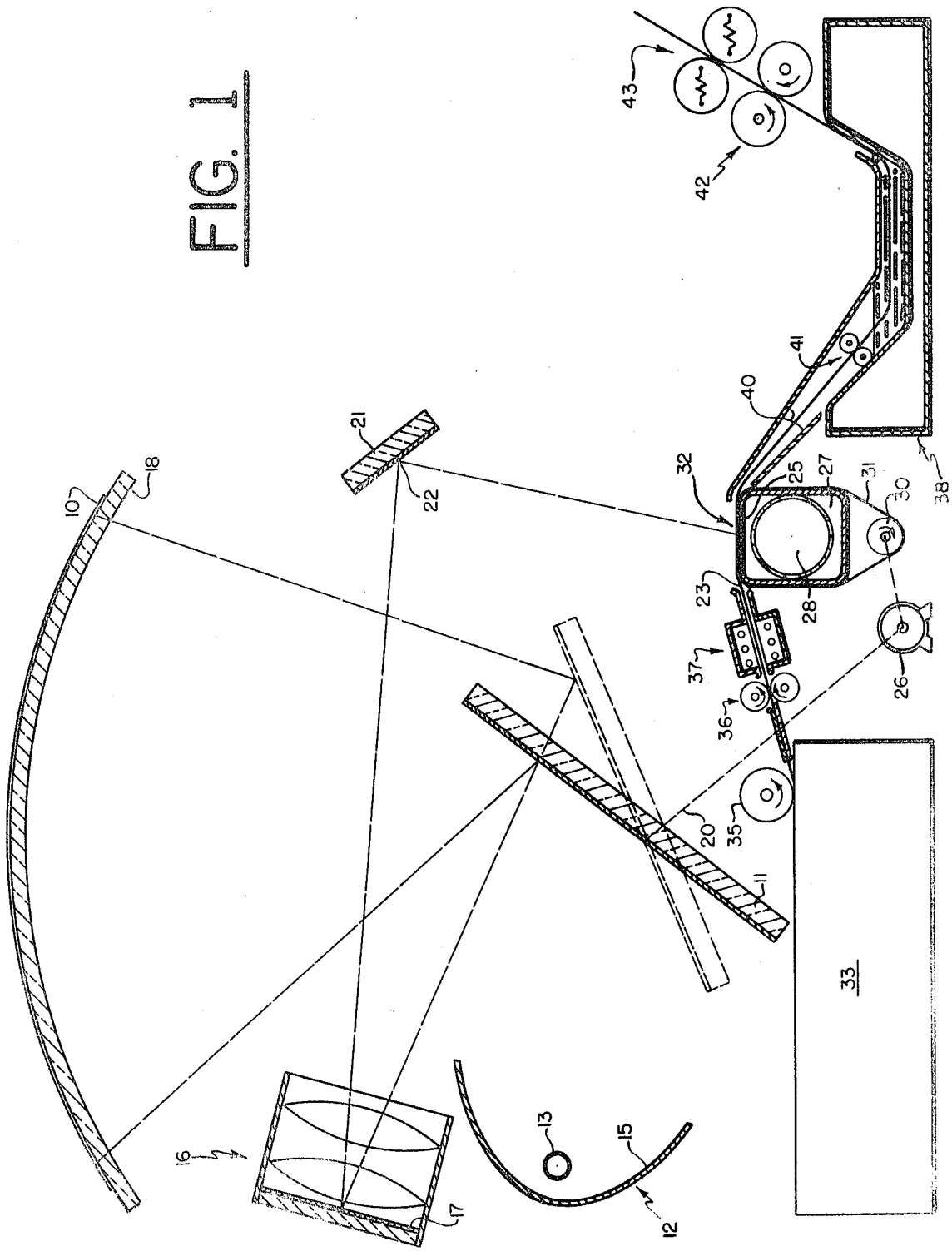
FIG. 1 is a diagrammatic view of a reprographic apparatus using the inventive optical scanning system.

FIG. 1 depicts electrophotographic copying apparatus in which stationary original 10 is scanned by single rotating scanning mirror element 11. Mirror element 11 scans original 10 with an illuminating beam from light source 12 which is depicted as linear tube 13, for example a quartz-iodine lamp, backed by reflector 15 which is elliptical with respect to an axis perpendicular to the plane of the drawing. Light source 12 may also be a plurality of point type light sources with reflectors. Positioned adjacent to light source 12 is reflex lens assembly 16 made up of half the elements of a objective lens and mirror surface 17 positioned at what would be the optical center of a complete objective lens. Light entering lens assembly 16 passes through the lens elements and is reflected back through them in a double pass to achieve the same focusing effect as a complete symmetrical objective lens. The paths of incidence and reflection for this type of lens are offcenter from and symmetrical about the optical axis. Original 10 is supported on a curved transparent surface such as cylindrical section of glass 18, cylindrical about rotational axis 20 of mirror 11. Lens assembly 16 is positioned to intercept image-modulated light produced by the scanning beam from light source 12 and reflected back against scanning mirror 11. This position of lens assembly 16 is further selected to redirect the light intercepted by mirror surface 17 to further mirror 21. Mirror surface 22 of mirror 21 further reflects the image-modulated light to a photosensitive medium in an image plane depicted as sensitized electrophotographic paper 23 moving on vacuum platen 25. While not critical, the mirror surfaces have in each case been depicted as on the illuminated surface of the mirror element, which has the advantage of avoiding optical path variations due to the refractive index of a glass mirror member.

The axis of rotation 20 of mirror 11 is located at a point tangent to the mirror (reflective) surface. The size and positioning of the various elements have to be selected with respect to a series of critical requirements. If a one-to-one magnification ratio is desired, as is common in reprographic apparatus, the optical path length from any scanned segment of original 10 to mirror surface 17 via the surface of mirror 11 must equal the optical path from mirror surface 17 to electrophotographic paper 23 via mirror surface 22. The path of reflected image-modulated light from mirror surface 17 to mirror surface 22 must clear mirror 11 through all the effective scanning positions of mirror 11. This clearance is preferably kept to a minimum in order to keep the angles of incidence and reflection on mirror 17 small.

In general, the sizes and positions of the various elements must relate to the focal length of the lens assembly which in turn must relate to cost and packaging requirements of specific reprographic apparatus. It will be recognized that it is also preferable to choose these parameters so as to minimize the angular rotation of mirror 11, again with the aim of keeping the angles of incidence and reflection at the mirror surface as small as possible. For this same reason it is desirable to have lens assembly 16 and light source 12 as close to the proximal scan path between mirror 11 and original 10 as possible while preventing light from light source 12 from directly illuminating any part of original 10 or illuminating lens assembly 16 by any reflection other than image-modulated reflection from a scanned portion of original 10. Light baffling plates (not shown) are positioned to prevent light from source 12 directly illuminating mirror 21 or sensitized electrophotographic paper 23.

The scanning motion of mirror 11 is provided by motor 26 in synchronism with movement of paper 23 on vacuum platen 25. Vacuum platen 25 is depicted as comprising plenum chamber 27 evacuated through duct-opening 28. Perforated belt 31 is driven by drive roller 30 around plenum chamber 27 and across the top of plenum chamber 27 which is flattened and perforated to form vacuum platen 25. Drive roller 30 is driven in synchronism with the rotation of mirror 11 so that electrophotographic paper adhering to belt 31 due to the vacuum is transported through exposure zone 32 in synchronism with the scanning of original 10.

Paper feed system 33 is depicted as a stack of electrophotographic sheets which can be fed one by one by paper feed member 35. Nip of drive rollers 36 follows the paper feed member to drive the electrophotographic sheets through sensitizing station 37, depicted as dual corona charging devices for electrostatically charging a paper before it passes to exposure zone 32. Following exposure zone 32 is processing station 38 depicted as a liquid electrophotographic processor from a carrier 1 in which electroscopic pigmented particles are attracted from a carrier liquid to an electrostatic image. Exposed electrophotographic sheet 23 is guided by channel 40 into processor drive nip 41 which drives paper 23 through the liquid developer and up into squeegee nip 42 which transports the copy paper from the processor while simultaneously squeegeeing excess carrier liquid from the paper.

Second set of rollers 43 are depicted as heated rollers for fusing the image and drying the paper as it leaves the copying apparatus.

Since the present invention is directed primarily to the type of optical system employed, the other potions of the reprographic apparatus are described only for purposes of a complete disclosure and may take any desired form without departing from the invention. For example, the electrophotographic paper could take the form of some other light-sensitive material and could be fed from a roll instead of stacked sheets. The sensitizing station 37 could take any form suitable to the photosensitive medium employed and the processing station 38 could utilize dry development techniques.

As depicted in Figure 1, it would be necessary to rotate scanning mirror 11 in oscillatory fashion by suitable motion transducing means. However, paper feed system 33 could readily be positioned sufficiently below the rotational path of mirror 11 to permit continuous 360° rotation. Specific mechanical means for providing the synchronized rotation are obvious to those skilled in the art and are not described in detail here.

Figure 2:
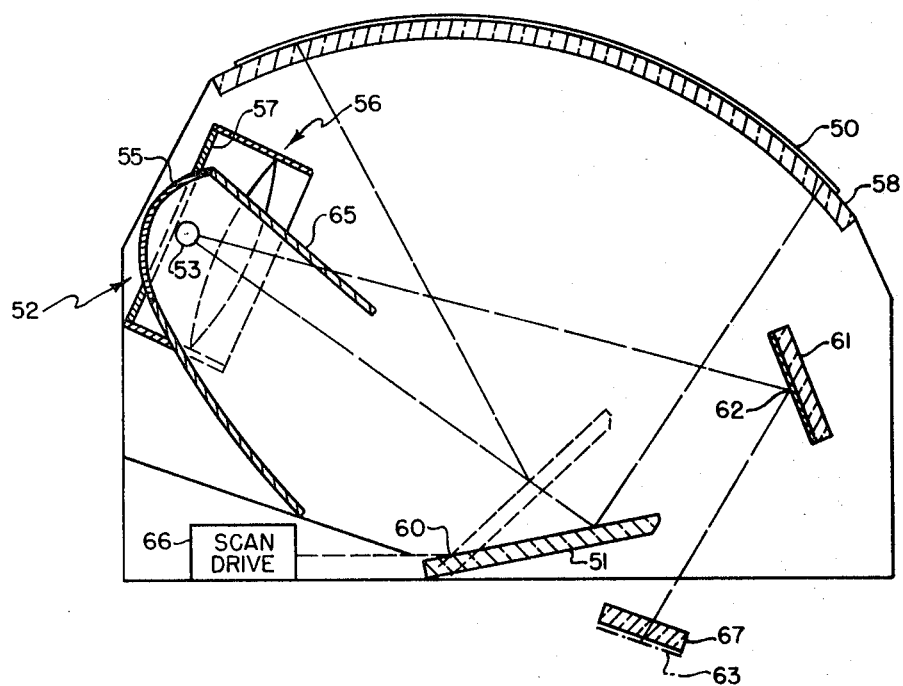
FIG. 2 is a diagrammatic view of a second embodiment of the inventive optical scanning system.

Figure 2 depicts a more compact embodiment of the inventive optical system arranged so that the illuminating light source illuminates the scanning mirror from substantially the same direction as the position of the lens assembly with respect to the scanning mirror. In this arrangement the same area of the scanning mirror is illuminated both by the light source ad the reflected image-modulated light, thus requiring a smaller mirror. However, illumination is a little bit less efficient in the specific arrangement illustrated since part of the elliptical reflector is replaced with a baffle of less desirable shape to prevent unmodulated light from reaching the image plane.

As in the embodiment of Figure 1, original 50 is scanned by scanning mirror 51 reflecting a beam of light from light source 52. Light source 52 comprises a light bulb 53 backed by a partial elliptical reflector 55. Light source 52 in this embodiment is positioned laterally adjacent lens assembly 56 and is preferably duplicated on the opposite side of lens assembly 56 to provide more uniform illumination. As in Figure 1, lens assembly 56 is depicted as a reflex lens assembly having a reflective mirror surface 57 behind the lens element. To use as small an area of mirror 51 as possible, bulb 53 can be positioned adjacent mirror surface 57 and substantially opposite the optical axis of the lens.

Original 50 is positioned on a window cylindrically curved with respect to rotational axis 60 of mirror 51. It will be noted that in the embodiment of FIG. 2 the axis of rotation of mirror 51 is nearly at one extreme end of the mirror. Because of this offcenter location of the rotational axis, it is preferable in machines using high scanning rates to add suitable counterbalance to the mirror assembly so as to avoid vibration.

Further mirror 61 is positioned to receive reflection from mirror surface 57 of image-modulated light incident thereon from mirror 51. Mirror surface 62 of mirror 61 in turn reflects the image to image plane 63, which may be occupied, for example, by a photosensitive member such as in FIG. 1. The position of light source 52 in the embodiment of FIG. 2 would allow direct illumination of mirror 61 from a direction that would result in reflection of this direct illumination onto the image plane 63. To avoid this, elliptical reflector 55 is interrupted by light-baffling plate 65 which cuts off the path of direct illumination to mirror 61. Mirror 51 is driven in oscillatory or rotational motion by means of scan drive 66 to scan original 50. FIG. 2 is depicted as is FIG. 1 to provide a one-to-one magnification ratio. Image plane 63 for this purpose is considered to be the bottom surface of glass plate 67. The embodiment of FIG. 2 is subject to the same general critical criteria as set forth for the embodiment of FIG. 1.

While the invention has been described with respect to specific preferred embodiments, many variations are possible without departing from the scope of the invention. For example, instead of using a reflex objective lens, it is possible to use a conventional symmetrical objective lens, in which case the image path would continue to the left as viewed with respect to FIG. 1 and 2 and could then be redirected by a stationary mirror to an image plane. This would have the advantage of reducing some of the light baffling problems. If it is desired to obtain a mirror image such as might be desired for a direct printing plate or for imaging on a reuseable electrophotographic member from which the image is to be transferred, mirror 61 can be eliminated or an additional further mirror can be provided.

The present invention can also be used to provide an image on a rotating drum by either making the scanning slit narrow enough so that the exposed area of the drum at any instant is essentially flat or by providing an additional lens such as a field lens to introduce curvature of the image at the drum surface. While both of the described embodiments are depicted with one-to-one magnification ratios, the magnification ratio can be readily varied by rearranging the optical path lengths in known manner. Such change in magnification would also require suitable modification of the speed of the imaging material or the imaging member with respect to the rotational speed of the scanning mirror.

Thus the present invention provides a compact optical imaging system for efficient scanning with a single rotating mirror element which may have very low mass.

I claim:

1. Optical scanning apparatus for incrementally simultaneously illuminating and scanning a stationary object and providing an image comprising:
   a. a light source;
   b. means to support an object in an object plane;
   c. a scanning mirror positioned to receive light from said source and illuminate a portion of said object plane;
   d. an objective lens positioned to intercept light reflected from the illuminated portion of said object plane;
   e. means to direct image light from said objective lens to an image plane; and,
   f. means to rotate said mirror so as to incrementally scan said object plane with light from said source while intercepting image-modulated reflected light and redirecting it to said lens.

2. Optical scanning apparatus according to claim 1 in which both said objective lens and said light source are fixed.

3. Optical scanning apparatus according to claim 2 in which both said light source and said objective lens are positioned in substantially the same angular position with respect to the direction of the scan.

4. Optical scanning apparatus according to claim 2 in which said objective lens is a reflex lens in which the intercepted light is reflected back through the lens elements by a mirror surface inside the lens assembly.

5. Optical scanning apparatus according to claim 4 in which said means to direct image light comprises a single mirror positioned to receive light from said lens without reflecting direct light from said source upon said image plane.

6. Reprographic apparatus for imaging a stationary original upon a moving photosensitive medium comprising:
   a. a scanning mirror having an axis of rotation;
   b. means to support an original to be reproduced in a curved plane cylindrical about said axis of rotation;
   c. a light source positioned to illuminate a portion of said curved plane by reflection from said mirror;
   d. an objective lens positioned to intercept light from the illuminated portion of said curved plane by reflection from said mirror and focus an image of said portion at an image plane;
   e. means to move a photosensitive medium through said image plane;
   f. means to rotate said mirror about said axis in synchronism with the movement of said photosensitive medium so that successive portions of said curved plane are incrementally illuminated and the image thereof focused by said lens upon incremental portions of said photosensitive medium; and,
   g. means to develop an image on said photosensitive medium.

7. Reprographic apparatus according to claim 6 in which said objective lens is a fixed reflex lens positioned so that it intercepts image-modulated light from said illuminated portion via said mirror at an angle of incidence offcenter of its optical axis and reflects said light back through its lens elements at an angle of reflection substantially symmetrical with said angle of incidence about said optical axis.

8. Reprographic apparatus according to claim 6 in which both said light source and said objective lens are fixed.

9. Reprographic apparatus according to claim 8 wherein said light source is laterally adjacent to said lens.

10. Reprographic apparatus according to claim 8 wherein a further mirror intercepts image-modulated light from said lens and reflects it upon said image plane.